United States Patent
Nagasawa

(10) Patent No.: US 12,397,735 B2
(45) Date of Patent: Aug. 26, 2025

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/649,483

(22) Filed: Apr. 29, 2024

(65) Prior Publication Data

US 2024/0391413 A1 Nov. 28, 2024

(30) Foreign Application Priority Data

May 24, 2023 (JP) .................. 2023-085471

(51) Int. Cl.
*B60R 21/233* (2006.01)
*B60R 21/0136* (2006.01)
*B60R 21/231* (2011.01)

(52) U.S. Cl.
CPC ........ *B60R 21/233* (2013.01); *B60R 21/0136* (2013.01); *B60R 2021/23107* (2013.01); *B60R 2021/23169* (2013.01); *B60R 2021/23324* (2013.01)

(58) Field of Classification Search
CPC ........ B60R 21/233; B60R 2021/23107; B60R 2021/23324; B60R 21/231
See application file for complete search history.

(56) References Cited

U.S. PATENT DOCUMENTS

| 5,577,765 | A * | 11/1996 | Takeda | B60R 21/233 280/743.1 |
| 6,962,363 | B2 * | 11/2005 | Wang | B60R 21/2338 280/739 |
| 10,183,645 | B2 * | 1/2019 | Rose | B60R 21/01552 |
| 10,710,539 | B2 * | 7/2020 | Cho | B60R 21/207 |
| 11,332,093 | B2 * | 5/2022 | Jaradi | B60R 21/231 |
| 11,548,468 | B2 * | 1/2023 | Tanaka | B60R 21/239 |

(Continued)

FOREIGN PATENT DOCUMENTS

| JP | S49-92729 A | 9/1974 |
| JP | 2004-512209 A | 4/2004 |

(Continued)

*Primary Examiner* — Paul N Dickson
*Assistant Examiner* — Tiffany L Webb
(74) *Attorney, Agent, or Firm* — Smith, Gambrell & Russell, LLP

(57) ABSTRACT

An airbag apparatus includes an airbag, a collision detector, and a deploying-gas supplier. The airbag is configured to be deployed in front of an occupant sitting in a seat of a vehicle. The collision detector is configured to detect an occurrence or sign of a collision of the vehicle. The deploying-gas supplier is configured to supply deploying gas into the airbag based on an output of the collision detector. The airbag includes first, second, and third bags. The first bag is configured to be deployed to restrain a right knee and a right shoulder of the occupant. The second bag is configured to be deployed to restrain a left knee and a left shoulder of the occupant. The third bag is configured to be deployed at a position closer to the occupant than the first bag and the second bag and to restrain lumbar and abdomen regions of the occupant.

6 Claims, 6 Drawing Sheets

(56) References Cited

U.S. PATENT DOCUMENTS

| | | | |
|---|---|---|---|
| 11,865,991 B1* | 1/2024 | Schneider | ......... B60R 21/23138 |
| 2003/0034637 A1 | 2/2003 | Wang et al. | |
| 2022/0348160 A1* | 11/2022 | Faruque | ................ B60R 21/233 |

FOREIGN PATENT DOCUMENTS

| | | |
|---|---|---|
| JP | 2006-88902 A | 4/2006 |
| WO | 02/004255 A2 | 1/2002 |

\* cited by examiner

AIRBAG APPARATUS

CROSS-REFERENCE TO RELATED APPLICATIONS

The present application claims priority from Japanese Patent Application No. 2023-085471 filed on May 24, 2023, the entire contents of which are hereby incorporated by reference.

BACKGROUND

The disclosure relates to an airbag apparatus intended for vehicles.

In Japanese Unexamined Patent Application Publication (Translation of PCT Application) No. 2004-512209, a multiple-chamber airbag is disclosed as an airbag apparatus intended for vehicles and is designed as follows. Gas supplied from an inflator is sent to a primary chamber and is further sent from the primary chamber to another chamber through a vent hole.

In a case of a two-chamber airbag, one or more apertures are opened between the primary and secondary chambers. The rear panel of the primary chamber includes vent openings and a gas inlet. Once the primary chamber inflates completely, then the secondary chamber inflates through an intercommunication vents positioned at the front panel of the primary chamber. Gas is vented into the secondary chamber through vent openings in the front panel.

An airbag apparatus disclosed in Japanese Unexamined Patent Application Publication No. 2006-88902 includes an oval-shaped supplementary airbag disposed behind (on the vehicle front side of) an airbag that is to come into contact with an occupant in a rear seat. The supplementary airbag is to be activated supplementarily if (under an impact of a predetermined level or greater) the airbag is not enough. The airbag and the supplementary airbag are neither coupled to each other nor provided with intercommunication paths for gas passage.

A two-part-airbag safety apparatus disclosed in Japanese Unexamined Patent Application Publication No. S49-92729 includes an airbag main part that protects the lower-half body of an occupant in a rear seat, and a separate airbag part that protects the occupant's head. The airbag main part and the separate airbag part communicate with each other through a vent port. Gas is to be supplied into the airbag main part and then flow through the vent port into the separate airbag part.

The airbag main part has a capacity corresponding to the occupant's lower-half body. To ease a sharp increase in the internal pressure of the airbag main part in the event of an impact that causes the occupant's body to move in such a manner as to press and deform the airbag main part, the gas is to be discharged from the vent port communicating with the separate airbag part, whereby the separate airbag part, which is initially folded, is to be deployed for the occupant's upper-half body.

SUMMARY

An aspect of the disclosure provides an airbag apparatus. The airbag apparatus includes an airbag, a collision detector, and a deploying-gas supplier. The airbag is configured to be deployed in front of an occupant sitting in a seat of a vehicle. The collision detector is configured to detect an occurrence or sign of a collision of the vehicle. The deploying-gas supplier is configured to supply deploying gas into the airbag based on an output of the collision detector. The airbag includes a first bag, a second bag, and a third bag. The first bag is configured to be deployed so as to restrain a right knee and a right shoulder of the occupant. The second bag is configured to be deployed so as to restrain a left knee and a left shoulder of the occupant. The third bag is configured to be deployed at a position closer to the occupant than the first bag and the second bag so as to restrain a lumbar region and an abdomen region of the occupant.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In an existing technique regarding a safety apparatus configured to protect the upper-half body of an occupant in a rear seat (a seat in any of the second and subsequent rows) of a vehicle in the event of a head-on collision of the vehicle, the energy of the collision is to be absorbed by deploying an airbag with the aid of a reaction force exerted by the backrest part of a seat in front of the occupant.

In such a technique, however, the positional relationship between the airbag and the occupant in the rear seat varies with the position of the front seat and the angle of the backrest part of the front seat. Consequently, occupant restrainability may become unstable.

In view of the above, it is desirable to provide an airbag apparatus configured to obtain a stable reaction force even in a case where the positional relationship between the occupant and a seat in front varies.

An airbag apparatus according to an embodiment of the disclosure will now be described. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is intended for a rear-row seat of a vehicle such as a passenger car.

In this specification and other relevant materials, the term "rear-row seat" generally refers to any seat in the second and subsequent ones of seat rows that are arranged one after another in the front-rear direction.

Figure 1:
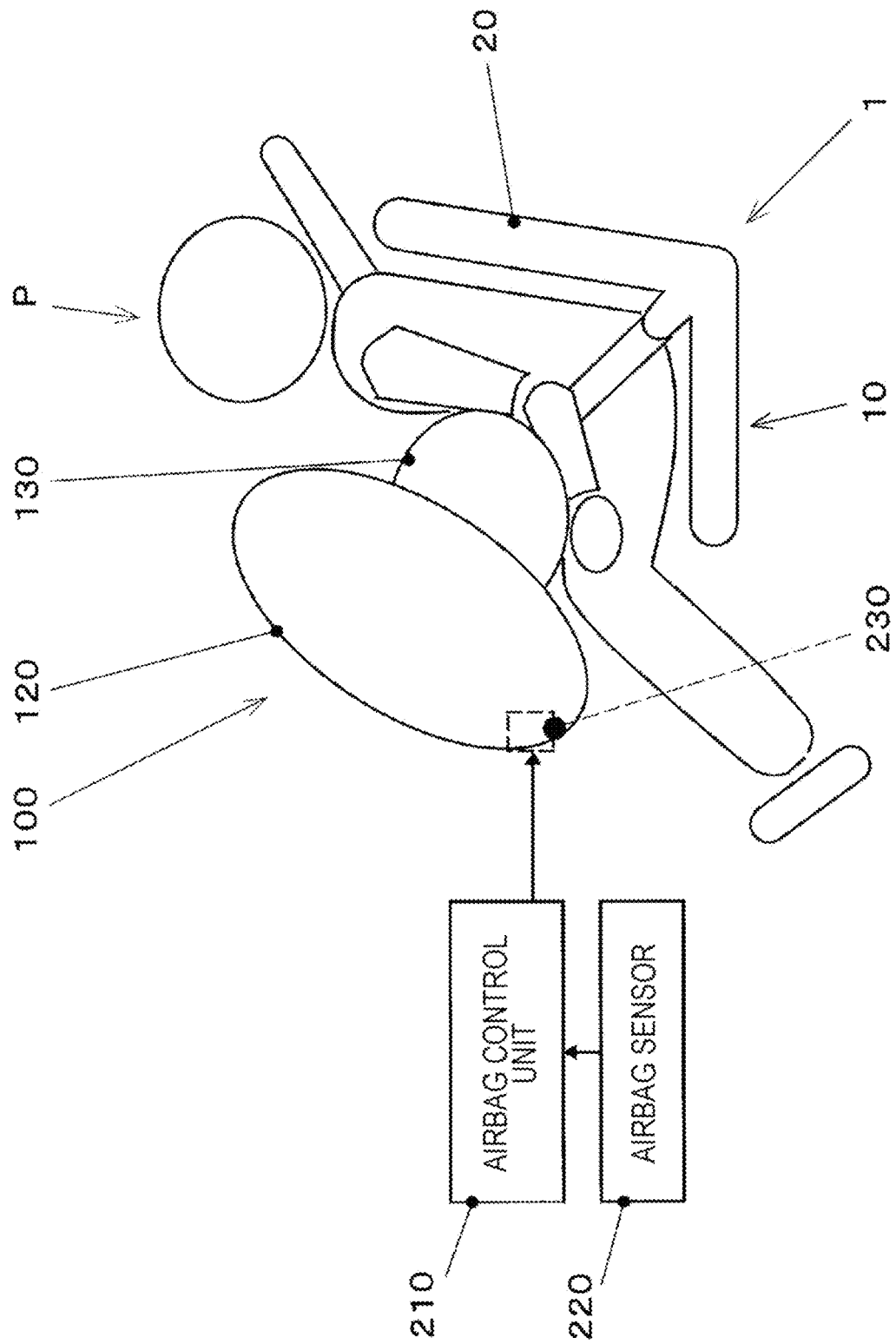
FIG. 1 is a schematic side view of an airbag apparatus according to an embodiment that is in a deployed state.

FIG. 1 is a schematic side view of the airbag apparatus according to the embodiment that is in a deployed state.

An occupant P to be restrained by the airbag apparatus is sitting in a rear-row seat 1.

In front of the rear-row seat 1 is disposed the backrest of a seat in front (not illustrated).

The rear-row seat 1 includes a seat cushion 10 and a backrest 20.

The seat cushion 10 is to receive the lumbar and femoral regions of the occupant P.

The backrest 20 is positioned to face the back of the occupant P.

The backrest 20 extends upward from near the rear end of the seat cushion 10.

The airbag apparatus includes an airbag 100, an airbag control unit 210, an airbag sensor 220, and an inflator 230.

The airbag 100 includes multiple bag members each being made of, for example, nylon-based foundation-fabric panels that are sawed together into a bag form.

When the airbag 100 is not in use (yet to be deployed), the airbag 100 is folded and housed in a retainer disposed in the backrest of the seat in front.

When deploying gas G is supplied from the inflator 230 into the airbag 100, the airbag 100 is deployed in front of the occupant P.

The airbag 100 includes a first bag 110, a second bag 120, and a third bag 130.

Figure 2:
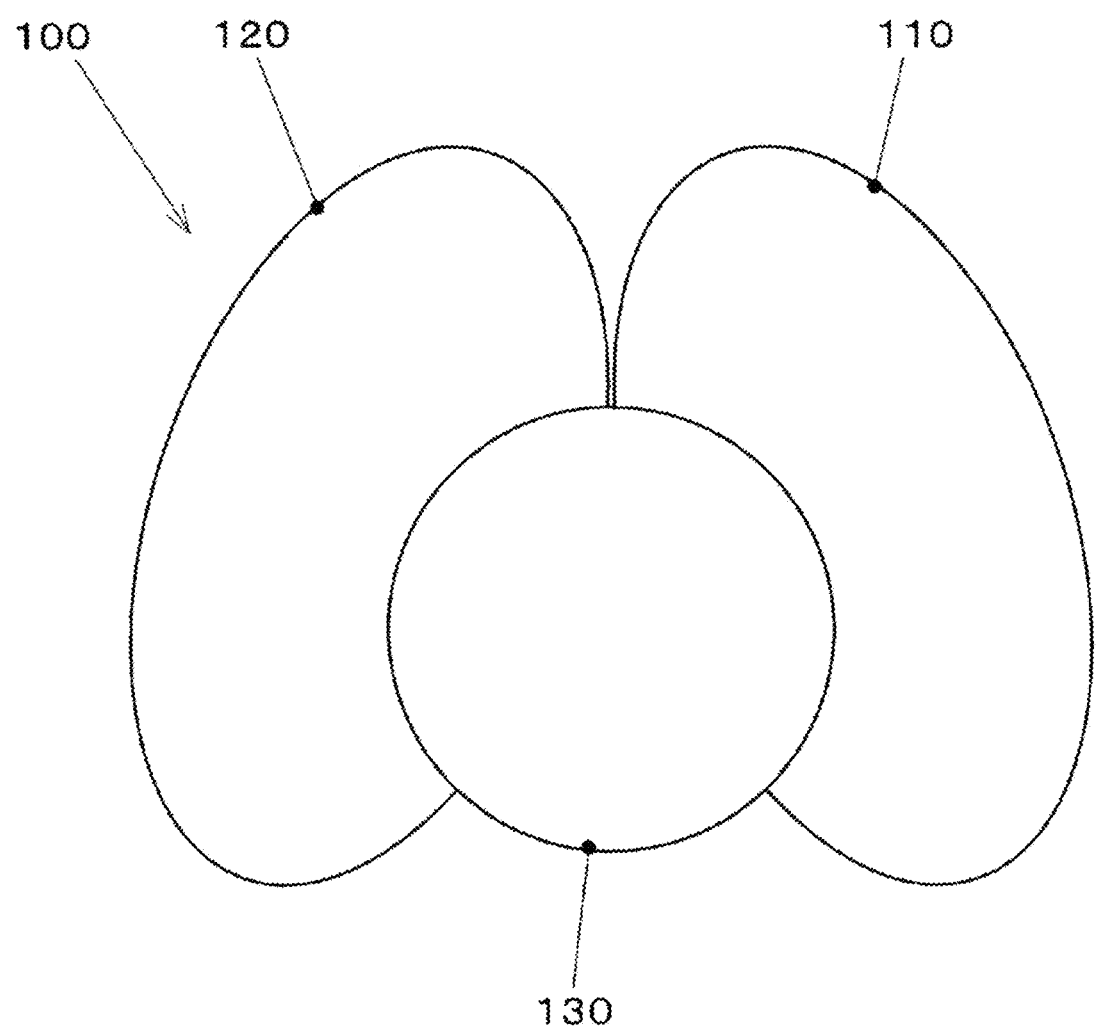
FIG. 2 illustrates an airbag according to the embodiment that is seen from the vehicle rear side.

FIG. 2 illustrates the airbag 100 that is seen from the vehicle rear side (occupant side).

Figure 3:
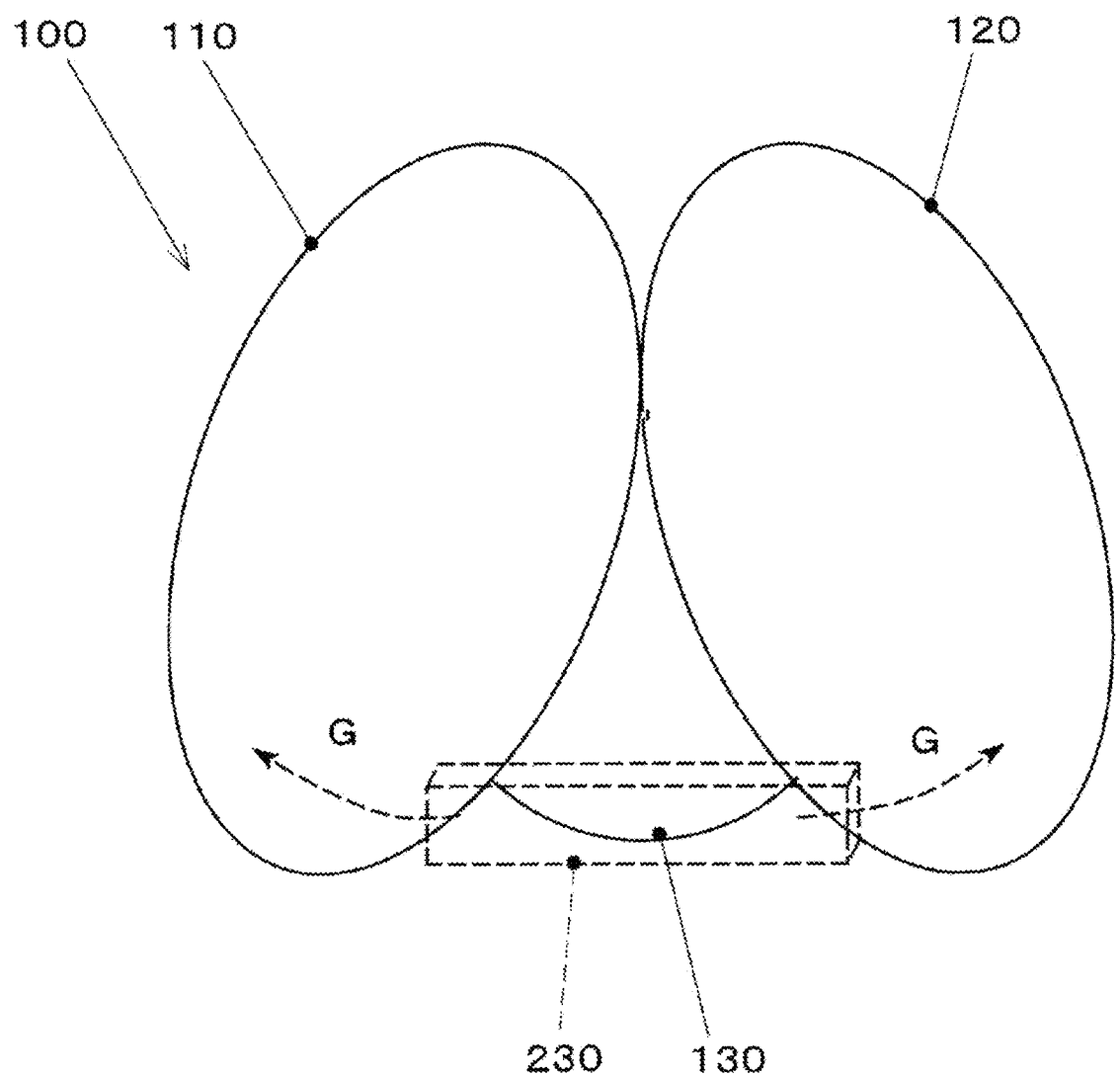
FIG. 3 illustrates the airbag according to the embodiment that is seen from the vehicle front side.

FIG. 3 illustrates the airbag 100 that is seen from the vehicle front side (front-seat side).

The first bag 110 is to be deployed in such a manner as to restrain the right knee and right shoulder of the occupant P.

After the first bag 110 is deployed, the first bag 110 has a spheroidal shape with the rotation axis inclined rearward.

A lower end portion of the first bag 110 is to be deployed in front of the right knee of the occupant P.

An upper end portion of the first bag 110 is to be deployed in front of the right shoulder of the occupant P.

The second bag 120 is to be deployed in such a manner as to restrain the left knee and left shoulder of the occupant P.

After the second bag 120 is deployed, the second bag 120 has a spheroidal shape with the rotation axis inclined rearward.

A lower end portion of the second bag 120 is to be deployed in front of the left knee of the occupant P.

An upper end portion of the second bag 120 is to be deployed in front of the left shoulder of the occupant P.

The first bag 110 and the second bag 120 are coupled to the inflator 230, which is disposed in the backrest of the seat in front.

The coupling part between the inflator 230 and each of the first bag 110 and the second bag 120 serves as a support for a corresponding one of the first bag 110 and the second bag 120.

Figure 4:
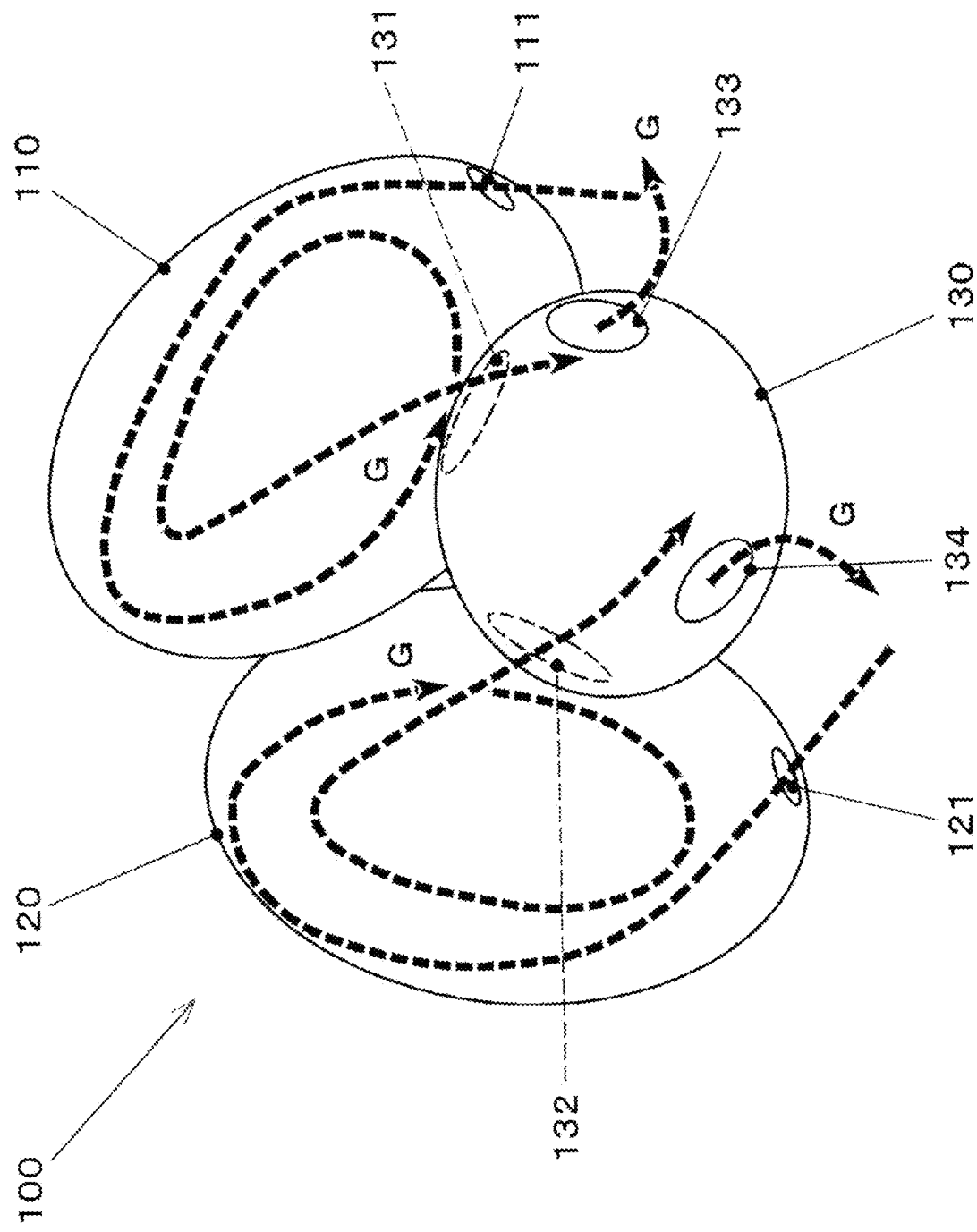
FIG. 4 schematically illustrates how deploying gas flows in the airbag according to the embodiment.

FIG. 4 schematically illustrates how the deploying gas G flows in the airbag 100 according to the embodiment.

The first bag 110 and the second bag 120 are supplied with the deploying gas G through respective gas introduction ports 111 and 121, which are disposed near the respective lower ends.

The third bag 130 is to be deployed in such a manner as to restrain the lumbar and abdomen regions of the occupant P.

The third bag 130 is to be located closer to the occupant P than (on the lower rear side of) the first bag 110 and the second bag 120.

The third bag 130 is supplied with the deploying gas G from the inflator 230 through the first bag 110 and through the second bag 120.

At the joint between the third bag 130 and the first bag 110 is disposed a gas introduction port 131.

At the joint between the third bag 130 and the second bag 120 is disposed a gas introduction port 132.

The third bag 130 is to be deployed by receiving the deploying gas G supplied thereto through the gas introduction ports 131 and 132.

The third bag 130 has vent holes 133 and 134, which are openings through which an excessive portion of the deploying gas G is to be released to the outside.

No passageway is provided at the joint between the first bag 110 and the second bag 120.

The airbag control unit 210 is configured to control the deployment of the airbag 100 by controlling the inflator 230 based on the output of the airbag sensor 220.

The airbag control unit 210 may be configured as a microcomputer including, for example, an information processor such as a central processing unit (CPU), a storage such as a random access memory (RAM) or a read-only memory (ROM), an input/output interface, and a bus that couples the foregoing elements to each other.

The airbag sensor 220 is a sensor, such as an acceleration sensor, configured to detect the occurrence of a head-on collision of the vehicle.

When an acceleration of a predetermined level or higher acts on the vehicle body, the airbag control unit 210 determines that a collision has occurred based on the output of the airbag sensor 220 and activates the inflator 230.

When the airbag control unit 210 has determined that a collision has occurred, the inflator 230 generates deploying gas G and introduces the deploying gas G into the airbag 100. In one embodiment, the inflator 230 may serve as a "deploying-gas supplier".

The inflator 230 includes, for example, a chemical gas generator.

Figure 5:
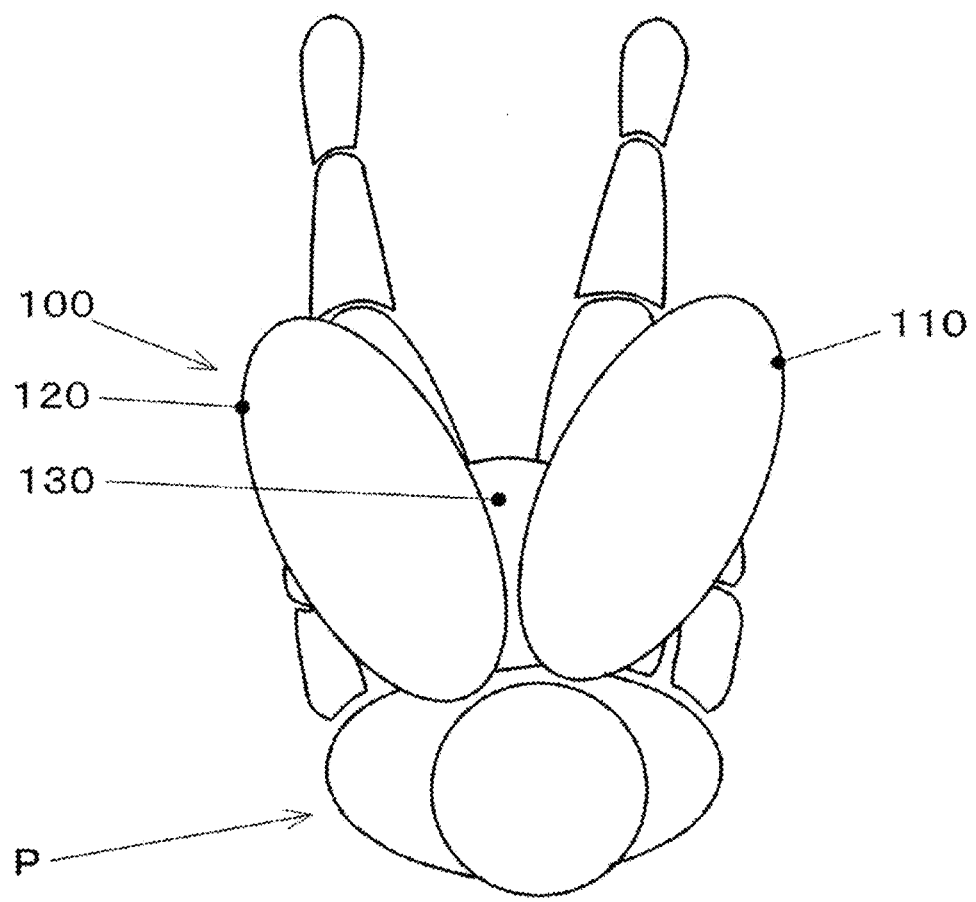
FIG. 5 illustrates the airbag according to the embodiment that has been deployed in front of an occupant facing frontward.

The inflator 230 is configured to supply the deploying gas G to the gas introduction port 111 of the first bag 110 and to the gas introduction port 121 of the second bag 120. FIG. 5 illustrates the airbag 100 according to the embodiment that has been deployed in front of the occupant P, who is facing frontward.

In the state illustrated in FIG. 5, the occupant P straightly faces the airbag 100, so that the head of the occupant P is restrained between an upper portion of the first bag 110 and an upper portion of the second bag 120.

The right shoulder and the left shoulder of the occupant P are evenly supported and restrained by the first bag 110 and the second bag 120, respectively.

Figure 6:
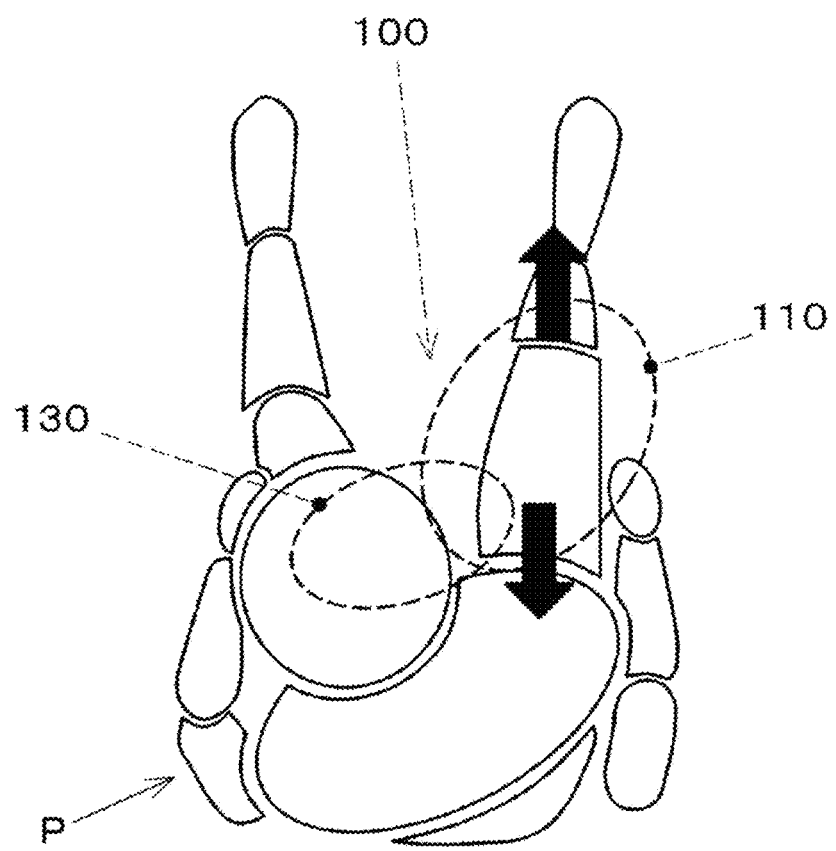
FIG. 6 illustrates the airbag according to the embodiment that has been deployed in front of the occupant, with the body of the occupant yawing leftward.

FIG. 6 illustrates the airbag 100 according to the embodiment that has been deployed in front of the occupant P, with the body of the occupant P yawing leftward.

In FIG. 6, for ease of illustration and understanding, the second bag 120 is not illustrated.

In the state illustrated in FIG. 6, the upper body of the occupant P is moving such that the right shoulder is rotated frontward, and the head of the occupant P is tilted leftward.

In a case where the right knee of the occupant P pushes a lower portion of the first bag 110 frontward, the internal pressure of the first bag 110 increases, causing the upper end portion of the first bag 110 to push the right shoulder of the occupant P rearward.

Thus, the yawing of the occupant P is reduced, and the occupant P resumes the position straightly facing the airbag 100.

According to the above embodiment, the following effects are produced.

(1) The first bag 110 and the second bag 120 are to receive a reaction force while being positioned between the respective shoulders and the respective knees of the occupant P. Thus, a stable reaction force is obtained regardless of the positional relationship between the occupant P and another seat (a seat in front) disposed in front of the seat 1. Consequently, the occupant restrainability is increased.

Furthermore, the third bag 130 that is to be located closer to the occupant P than the first bag 110 and the second bag 120 is to restrain the lumbar and abdomen regions of the occupant P. Thus, the lumbar region that serves as a pivot for the frontward tilting of the upper-half body of the occupant P is to be restrained appropriately.

(2) The first bag 110 is to restrain the right shoulder of the occupant P in response to a force inputted from the right knee, and the second bag 120 is to restrain the left shoulder of the occupant P in response to a force inputted from the left knee. Therefore, if the body of the occupant P yaws (rotates about the vertical axis) in the event of a collision, a force is inputted from either of the knees to a corresponding one of the first bag 110 and the second bag 120. Thus, a corresponding one of the shoulders that has received the force is restrained. Consequently, the yawing of the body of the occupant P is reduced.

(3) The inflator 230 is configured to supply the deploying gas G to the first bag 110 and to the second bag 120. The third bag 130 is to be supplied with the deploying gas G from the first bag 110 and from the second bag 120. Thus, the internal pressures of the first bag 110 and the second bag 120 are to be made higher than the internal pressure of the third bag 130, whereby the way of deployment of the first bag 110 and the second bag 120 is stabilized. Hence, the frontward tilting of the upper-half body of the occupant P is controllable more stably by the first bag 110 and the second bag 120.

(4) The first bag 110 and the second bag 120 communicate with each other through the third bag 130. Thus, an increase in the internal pressure that occurs when the first bag 110 or the second bag 120 is pushed by a corresponding one of the knees of the occupant P is effectively utilized by the first bag 110 or the second bag 120 to restrain a corresponding one of the shoulders of the occupant P.

(5) The first bag 110 and the second bag 120 after being deployed each have a spheroidal shape with the rotation axis inclined rearward. Furthermore, the third bag 130 after being deployed has a spherical shape. Thus, the above effects are produced appropriately with the bags 110, 120, and 130 having simple shapes.

Modifications

The disclosure is not limited to the above embodiment. Various modifications and changes can be made to the embodiment. Such modifications and changes are also within the technical scope of the disclosure.

(1) The shapes, structures, materials, production methods, arrangements, quantities, and other relevant factors of the elements forming the airbag apparatus, the vehicle seat, and the vehicle are not limited to those employed by the above embodiment and may be changed as appropriate.

(2) While the above embodiment relates to a case where the first bag and the second bag of the airbag are supplied with the deploying gas from a shared inflator, the disclosure is not limited to such an embodiment. The first bag and the second bag may be provided with respective inflators that are independent of each other.

(3) The airbag may include an additional bag, besides the first to third bags employed by the above embodiment.

The invention claimed is:

1. An airbag apparatus comprising:
an airbag configured to be deployed in front of an occupant sitting in a seat of a vehicle;
a collision detector configured to detect an occurrence or sign of a collision of the vehicle; and
a deploying-gas supplier configured to supply deploying gas into the airbag based on an output of the collision detector,
wherein the airbag comprises
a first bag configured to be deployed so as to restrain a right knee and a right shoulder of the occupant;
a second bag configured to be deployed so as to restrain a left knee and a left shoulder of the occupant; and
a third bag configured to be deployed at a position closer to the occupant than the first bag and the second bag so as to restrain a lumbar region and an abdomen region of the occupant, and
wherein the first bag is configured to restrain the right shoulder of the occupant in response to a force inputted from the right knee, and
wherein the second bag is configured to restrain the left shoulder of the occupant in response to a force inputted from the left knee.

2. The airbag apparatus according to claim 1,
wherein the deploying-gas supplier is configured to supply the deploying gas to the first bag and to the second bag, and
wherein the third bag is configured to be supplied with the deploying gas from the first bag and from the second bag.

3. The airbag apparatus according to claim 2,
wherein the first bag and the second bag communicate with each other through the third bag.

4. The airbag apparatus according to claim 1,
wherein the first bag and the second bag communicate with each other through the third bag.

5. The airbag apparatus according to claim 1,
wherein the first bag and the second bag are each configured to have a spheroidal shape with a rotation axis inclined rearward after being deployed, and
wherein the third bag is configured to have a spherical shape after being deployed.

6. The airbag apparatus according to claim 5,
wherein the deploying-gas supplier is configured to supply the deploying gas to the first bag and to the second bag, and
wherein the third bag is configured to be supplied with the deploying gas from the first bag and from the second bag.

* * * * *